Oct. 15, 1940.   L. U. LARKIN   2,218,115
APPARATUS FOR MANUFACTURING FINNED STRUCTURES
Filed June 4, 1938
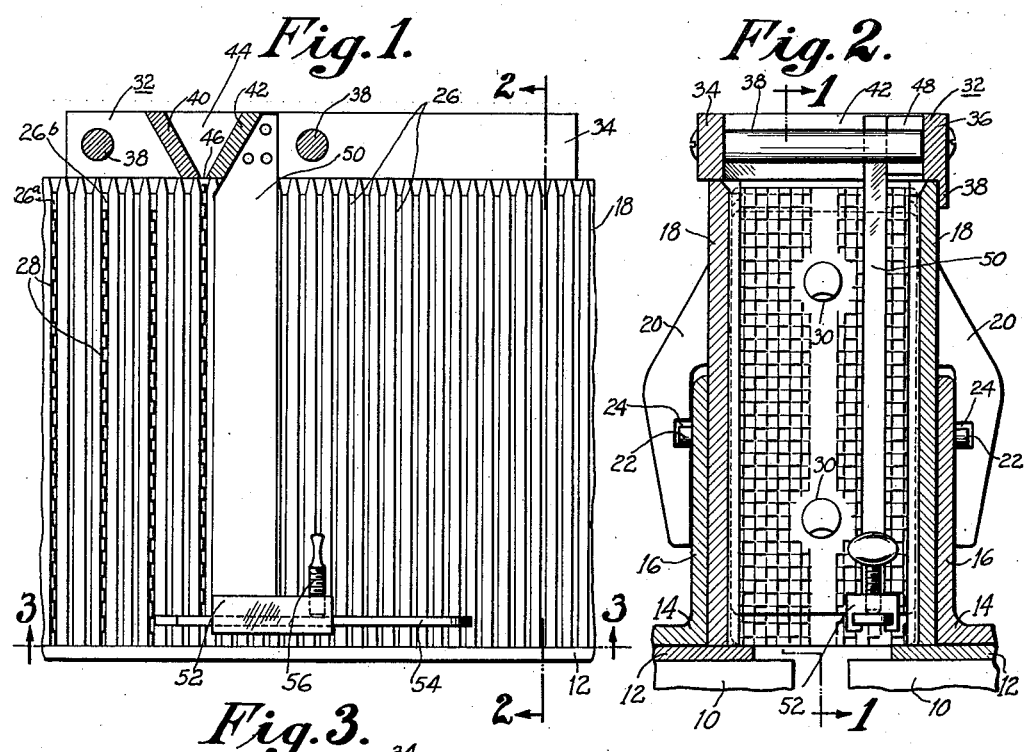
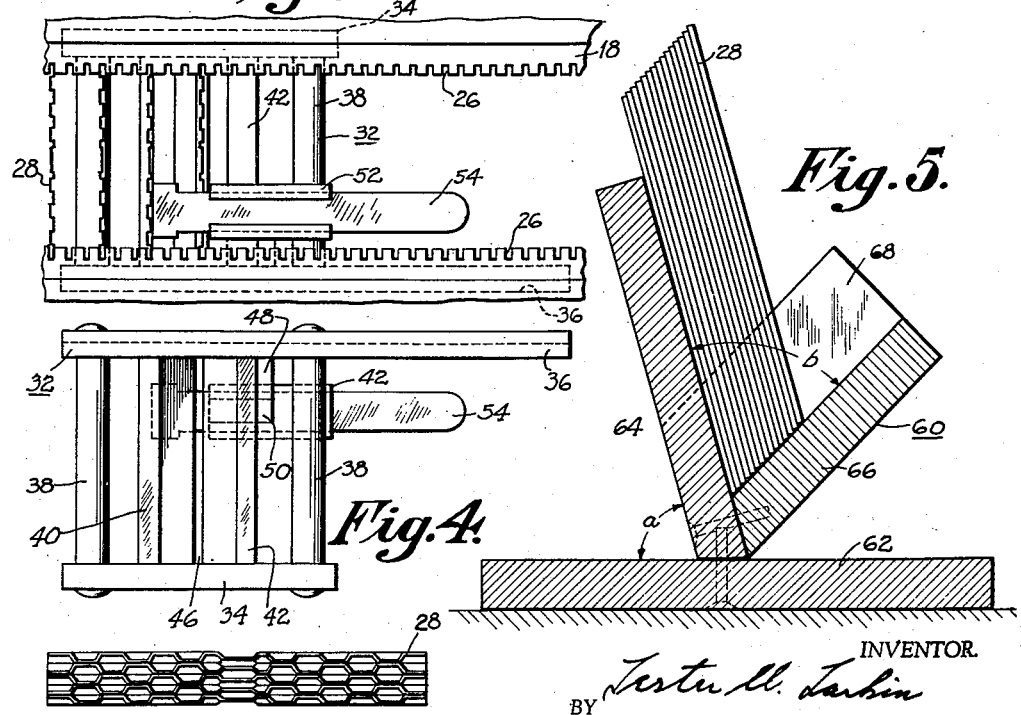
INVENTOR.
BY
his ATTORNEY.

Patented Oct. 15, 1940

2,218,115

UNITED STATES PATENT OFFICE 2,218,115

APPARATUS FOR MANUFACTURING FINNED STRUCTURES

Lester U. Larkin, Baltimore, Md., assignor to Lester U. Larkin, Inc., Baltimore, Md., a corporation of Maryland Application June 4, 1938, Serial No. 211,757

9 Claims. (Cl. 214—8)

My invention relates to apparatus for manufacturing finned structure, and more particularly finned tubing for use in heat exchangers, for instance evaporator coils of a mechanical refrigerating system.

In my copending application, Serial No. 196,881, filed March 19, 1938, there is disclosed an apparatus for manufacturing such finned structures. This apparatus includes a framework supporting comb sections in the form of oppositely disposed plates having equally spaced grooves in their adjacent faces. A carriage is arranged to move along the comb sections and includes mechanism for feeding and depositing fins in proper spaced relationship in the grooves of the sections. In the aforesaid application this carriage is shown as being operated by an electric motor and it includes automatic mechanism which functions to cause the carriage to first deposit a fin, then to move a predetermined distance and then deposit another fin. This is repeated without requiring the attention of the operator and its operation is fully automatic.

In accordance with the present invention there is provided a simple manually operated device for replacing the automatic carriage. This device may be used in case the automatic carriage gets out of order, or it may replace the automatic carriage if the first cost of the device is of more importance than the cost of operating it, inasmuch as the device in accordance with the present invention is much simpler and cheaper than the automatic carriage, but its operation requires the constant attention of the operator.

In accordance with my invention there is also provided a device for holding fins in stacked relationship, but in such a way that an operator may rapidly remove one fin, and only one fin, at a time.

Further objects and advantages of my invention will be apparent from the following description considered in connection with the accompanying drawing, which forms a part of this specification and of which:

Fig. 1 is a cross-sectional view showing a portion of a comb section with a fin guiding and depositing device in accordance with my invention, and is taken on the line 1—1 of Fig. 2;

Fig. 2 is a cross-sectional view taken on the line 2—2 of Fig. 1;

Fig. 3 is a bottom view taken on the line 3—3 of Fig. 1;

Fig. 4 is a top view of the fin guiding and depositing device shown in the preceding figures;

Fig. 5 is a cross-sectional view of a device for holding fins in stacked relationship; and Fig. 6 is an end view of a plurality of fins illustrating the manner in which they are held in the device shown in Fig. 5.

Referring more particularly to Figs. 1 and 2, reference characters 10 designate members forming part of an elongated frame structure. Suitably supported on members 10 are plates 12 to which are welded, or otherwise suitably secured, structural steel angles 14. The vertical legs 16 of these angles serve to support comb sections 18. These sections are in the form of plates to one side of which are secured brackets 20. These brackets are so formed that the vertical legs 16 of the angles are received with a snug fit between the plates and the brackets. Lugs 22 are secured to the outer sides of the angles and are adapted to be received within recesses 24 formed in the brackets. To assemble these parts, the plates and brackets are moved downwardly over the vertical legs 16 with the brackets out of alignment with the lugs 22. Thereafter, the plates and brackets are slid horizontally until the lugs are received in the recess. The lugs prevent unintentional raising of the plates 18 and further downward movement of these plates is prevented by their lower edges contacting the horizontal plates 12.

The inner faces of plates 18 are formed with a plurality of parallel spaced grooves 26 which are adapted to receive fins 28 made of thin sheet metal. These fins are formed with pockets, as is shown in Figs. 1 to 3 and particularly Fig. 6. The pockets are formed symmetrically so that the fins have an overall width materially greater than the thickness of sheet used. The pockets or indentations may be of any desired shape and may cover the entire surface of the fin, or only a portion thereof. As shown they are square and are formed over the entire surface of the fin, with the exception of an area of small width extending along the vertical center line of the fin. Also, the fins are formed with two spaced apertures 30 loccated on the vertical center line.

The device for guiding and depositing fins 28 within the grooves 26 is designated generally by reference character 32. It consists of parallel members 34 and 36 which are held in fixed spaced relationship by means of rods 38, or the like. Members 34 and 36 are adapted to slide along the upper edges of the plates 18, and the member 36 is formed with a depending flange 38 which contacts the outer face of one of the plates 18 in order to guide the device 32.

A pair of plates 40 and 42 extend between the members 34 and 36 and are disposed angularly with respect to each other so as to provide a V-shaped trough 44 therebetween. The lower edges of the plates 40 and 42 are spaced apart so as to form a slot 46 at the apex of the V-shaped trough. The distance between the members 34 and 36, and hence the length of the trough 44 is substantially equal to the horizontal distance between the bottoms of corresponding grooves 26 in the plates 18, as appears from Fig. 2.

Extending downwardly and rigidly secured to the member 36 by means of a spacing block 48 is an arm 50. When the device 32 is in place on the plates 18, the arm 50 extends to near the bottom edges of the plates 18. Secured to the lower end of arm 50 is a block or the like 52 formed with a slot in which is slidably and adjustably received an arm 54. A set screw 56 is provided for retaining the arm 54 in adjusted position.

The operation of the above described apparatus is as follows: The device 32 is placed in position on the upper edges of the plates 18 with the slot 46 in alignment with the first pair of grooves 26a in which it is desired to deposit a fin. The operator then inserts the lower end of a fin into the trough 44 and it is guided into the aforesaid pair of grooves 26. While this operation could be performed without the use of the device 32, the grooves 26 are so close together that considerable care would have to be exercised by the operator in order to be certain that the opposite edges of the fin were received in opposite grooves 26.

The device 32 is then slid to the right as viewed in Fig. 3, along the upper edges of the plates 18 until the slot 46 is in alignment with the next pair of grooves 26 in which it is desired to deposit a fin. As shown in Fig. 1, the fins are being deposited in every third pair of grooves 26, and consequently for this spacing of the fins the slot 46 would be aligned with the groove 26b in Fig. 1. The arm 54 is then moved to the left, as shown in Fig. 1, until it contacts the face of the first fin to have been deposited, that is the fin retained in the grooves 26a. The set screw 56 is now tightened so as to retain the arm 54 in this position. Another fin is then inserted into the trough 44 and is guided through the slot 46 into the pair of grooves 26b. Downward movement of this fin is arrested by the arm 54. The device 32 is then moved further to the right and as soon as the arm 54 clears the lower end of the last fin deposited, this fin drops down until it strikes the plates 12. The device 32 is then slid back toward the left, as viewed in Fig. 1, until the left hand end of arm 54 strikes this fin. The slot 46 is now in alignment with the next pair of grooves in which it is desired to deposit a fin, and the operator inserts a fin into the trough 44 and it is guided through the slot 46 into the proper pair of grooves 26.

Once the arm 54 has been adjusted, the operator is able to deposit fins very rapidly. All he has to do, after he has deposited a fin, is to move the device 32 to the right until the last fin drops all the way down, then move the device 32 to the left slightly until the arm 54 contacts the last fin, and then insert another fin into the trough 44.

In performing the above operations the operator moves the device 32 with one hand and places fins in the trough 44 with the other. In order to aid him in rapidly picking up one fin at a time with one hand, there is provided the fin holder, designated generally by reference character 60 and shown in Fig. 5. This holder includes a base 62 to which is secured a member 64 forming an angle $a$ with a base of less than 90°. Another member 66 is secured to the member 64 so as to form therewith an angle $b$, which is less than 90°. The width of member 64 and member 66 is substantially equal to the width of the fins 28 and side pieces 68 are provided for retaining the fins in the angular space formed between the members 64 and 66. Due to the fact that the angle $b$ is less than 90°, each fin in the stack will be slightly out of line with adjacent fins, and the upper edge of the first fin in the stack extends slightly above the other fins. The operator is thus able to rapidly pick off one fin at a time by moving his hand from left to right, as viewed in Fig. 5, in a substantially horizontal direction across the top of the stack of fins. His hand will contact only the upper edge of the first fin in the stack and will cause it to pivot about its lower edge and away from the remaining fins whereupon he may readily grasp it and insert it in the trough 44 of the device 32.

The nature of the pockets or indentations in the fins is such that they are able to nest if they are all placed the same way in the stack, that is, the projections on one fin will be received within the recesses on adjacent fins. If the fins are arranged in this manner it is practically impossible for an operator to rapidly pick off but one fin at a time when using one hand. In order to avoid this, the fins are preferably arranged as shown in Fig. 6. As will be apparent from this figure, the projections and recesses on one fin are in alignment with the projections and recesses, respectively, on the adjacent face of the next fin. Consequently, nesting of the fins is prevented and the operator is able to rapidly pick one fin at a time from the stack shown in Fig. 5.

It is to be understood that the foregoing description is for the purpose of illustration only and that the scope of my invention is not to be restricted to that which has been shown and described.

What I claim is:

1. In a device for fabricating finned structure, stationary retaining means for fins, means movable with respect to said retaining means for guiding fins to spaced locations in said retaining means, and structure carried by the guiding means and cooperating with a fin previously deposited for determining the movement of said guiding means necessary to provide the spacing of the fins.

2. In a device for fabricating finned structure, fixed retaining means for fins, movable means for guilding fins to spaced locations in said retaining means, and a member mounted on and adjustable with respect to the guiding means for contacting the last fin deposited for determining the spacing therefrom of the next fin to be deposited.

3. In an apparatus for fabricating finned devices, retaining means for fins, and structure movable along said retaining means, said structure including means for guiding fins into said retaining means, and an arm for contacting the last fin deposited to determine the spacing therefrom of the next fin to be deposited.

4. In an apparatus for fabricating finned devices, fin retaining means including spaced plates formed with fin receiving grooves in their adjacent faces, and structure movable along the edges of said plates and including means for guiding fins into said grooves, and an arm for contacting the last fin deposited to determine the spacing therefrom of the next fin to be deposited.

5. In an apparatus for fabricating finned devices, fin retaining means including spaced plates formed with fin receiving grooves in their adjacent faces, and structure movable along the edges of said plates and having a V-shaped trough formed with a slot at the apex alignable with opposite grooves in said plates for guiding a fin thereinto, said structure including an arm adapted to contact the last fin deposited to locate said structure for proper spacing of the fins.

6. In a device for fabricating finned structure, fin retaining means including spaced plates formed with fin receiving grooves in their adjacent faces, a pair of members held in spaced relationship and movable along the edges of said plates, transversely extending means disposed between said members and providing a V-shaped trough formed with a slot at the apex alignable with opposite grooves in said plates for guiding a fin thereinto, and an arm carried by said members and extending between said plates for contacting the last fin held in said retaining means to locate said slot in alignment with the proper pair of opposite grooves to give the desired spacing of said fins.

7. In a device for fabricating finned structure, fin retaining means including spaced plates formed with fin receiving grooves in their adjacent faces, a pair of members held in spaced relationship and movable along the edges of said plates, transversely extending means disposed between said members and providing a V-shaped trough formed with a slot at the apex alignable with opposite grooves in said plates for guiding a fin thereinto, a third member rigidly secured to said members and extending between said plates, and an arm adjustably carried by said third member and extending substantially at right angles to the grooves in said plates for contacting the last fin held in said retaining means to locate said slot in alignment with the proper pair of opposite grooves to give the desired spacing of said fins.

8. In a device for fabricating finned structure, a pair of spaced parallel rail members, a pair of angularly disposed plates secured between said rail members, said plates forming a V-shaped trough having a slot at the apex, a member rigidly secured to said rail members and extending below said plates and entirely to one side of said slot, and an arm carried by the last mentioned member and extending underneath said slot.

9. In a device for fabricating finned structure, a pair of spaced parallel rail members, a pair of angularly disposed plates secured between said rail members, said plates forming a V-shaped trough having a slot at the apex, a member rigidly secured to said rail members and extending below said plates and entirely to one side of said slot, an arm movably carried by the last mentioned member and extending underneath said slot, and means for securing said arm in adjusted position.

LESTER U. LARKIN.